US012694339B2

(12) United States Patent
Lim et al.

(10) Patent No.: US 12,694,339 B2
(45) Date of Patent: Jul. 28, 2026

(54) CLOUD-BASED DEVICE ARTIFICIAL INTELLIGENCE CONFIGURATION SYSTEM AND METHOD

(71) Applicant: SIMPLATFORM CO., LTD, Seoul (KR)

(72) Inventors: Dae Gun Lim, Daejeon (KR); Min Sang Kim, Seoul (KR); Hong Gyu Ryu, Seoul (KR)

(73) Assignee: SIMPLATFORM CO., LTD, Seoul (KR)

( * ) Notice: Subject to any disclaimer, the term of this patent is extended or adjusted under 35 U.S.C. 154(b) by 609 days.

(21) Appl. No.: 18/323,890

(22) Filed: May 25, 2023

(65) Prior Publication Data

US 2023/0306309 A1      Sep. 28, 2023

Related U.S. Application Data

(63) Continuation of application No. PCT/KR2021/016845, filed on Nov. 17, 2021.

(30) Foreign Application Priority Data

Nov. 26, 2020    (KR) ........................ 10-2020-0161282

(51) Int. Cl.
*G06F 7/00*        (2006.01)
*G06N 20/00*        (2019.01)
(52) U.S. Cl.
CPC .................................... *G06N 20/00* (2019.01)

(58) Field of Classification Search
CPC .................................................... G06N 20/00
USPC ..................................... 707/600–899; 706/12
See application file for complete search history.

(56) References Cited

U.S. PATENT DOCUMENTS

2020/0014761 A1      1/2020   Kawaai et al.
2021/0366472 A1*    11/2021   Lee ..................... G10L 15/1815

FOREIGN PATENT DOCUMENTS

| JP | 2020-119017 A | 8/2020 |
| KR | 10-0570528 B1 | 4/2006 |
| KR | 10-2020-0014510 A | 2/2020 |
| KR | 10-2094856 B1 | 3/2020 |
| KR | 10-2020-0037602 A | 4/2020 |
| KR | 10-2020-0100677 A | 8/2020 |

* cited by examiner

*Primary Examiner* — Isaac M Woo
(74) *Attorney, Agent, or Firm* — United One Law Group LLC; Kongsik Kim; Jhongwoo Peck

(57)        ABSTRACT

An artificial intelligence configuration system and an artificial intelligence configuration method include a device type information storage unit configured to store device type information for a plurality of device types to be monitored; an artificial intelligence configuration information storage unit configured to store one or more pieces of artificial intelligence configuration information for each of the device types; a device information storage unit configured to store device information for each actual device of each of the device types; an artificial intelligence configuration unit; a device configuration unit; and a sensing data analysis unit, and an artificial intelligence configuration method.

9 Claims, 6 Drawing Sheets

FIG. 3

← AI Configuration Generation

① Reference Device  ① Select device

②
- Device 001 [BCQ0S8TGY31]
- Device 002 [BCQ0S8TGY32]

③ ① Select Data Interval
- ◇ Start Date and Time
  Start date
- ◇ End Date and Time
  End date Retrieve Data

① Original Data  ④ Set Target

| DateTime | Target | Temperature | Humidity | CO2 | VOCs | CO |
|---|---|---|---|---|---|---|
| 2019.6.19 18:43 | | 27.5 | 42 | 720 | 9 | 0 |
| 2019.6.19 18:43 | 1 | 27.5 | 6 | 726 | 9 | 0 |
| 2019.6.19 18:57 | 1 | 23.1 | 53 | 995 | 0 | 0 |
| 2019.6.19 18:57 | 1 | 23.6 | 51 | 916 | 4 | 0 |
| 2019.6.19 18:58 | | 24.3 | 50 | 834 | 13 | 0 |
| 2019.6.19 18:58 | | 24.7 | 49 | 774 | 22 | 0 |
| 2019.6.19 18:59 | | 25.1 | 48 | 750 | 35 | 0 |
| 2019.6.19 18:59 | | 25.7 | 47.5 | 759.5 | 47 | 0 |
| 2019.6.19 19:00 | | 26.3 | 47 | 792 | 50 | 0 |
| 2019.6.19 19:00 | | 26.6 | 46 | 805 | 57 | 0 |

① Learning Data

| Target | Temperature | Humidity |
|---|---|---|
| | 27.5 | 42 |
| | 27.5 | 6 |
| 1 | 23.1 | 53 |
| 1 | 23.6 | 51 |
| 1 | 24.3 | 50 |
| | 24.7 | 49 |
| | 25.1 | 48 |
| | 25.7 | 47.5 |
| | 26.3 | 47 |
| | 26.6 | 46 |

① Set Data Learning
- ◇ Learning Algorithm
  Random Forest ▽
- ⑤ ◇ Number of Estimators
  10
- ◇ Max Depth
  None ▽
- ◇ Max Features
  Auto ▽

① Evaluate Learning Model
- ◇ Number of evaluations
  5
- ⑥ Perform Evaluation

① Apply AI Configuration
- ◇ AI configuration name *
  Algorism name 1
- ⑦ Apply Configuration

FIG.  5

ⓘ Target Setting                                                              ✕

| Index | Target name | 🗑 |
|-------|-------------|---|

| Index | Target name | 🗑 |
|-------|-------------|---|

(Cancel)    (Confirm)

CLOUD-BASED DEVICE ARTIFICIAL INTELLIGENCE CONFIGURATION SYSTEM AND METHOD

CROSS-REFERENCE TO RELATED APPLICATIONS

This application is a Continuation of International Application No. PCT/KR2021/016845 filed on Nov. 17, 2021, which claims priority from Korean Application No. 10-2020-0161282 filed on Nov. 26, 2020. The aforementioned applications are incorporated herein by reference in their entireties.

TECHNICAL FIELD

The present invention relates to a cloud-based device artificial intelligence configuration system and method, and more particularly, to a system and method that enable artificial intelligence analysis to be easily applied to a device of a user in such a manner that the user registers the device and selects an artificial intelligence configuration in a cloud system.

RELATED ART

As artificial intelligence technology develops, there is boosted smart factory technology that can monitor various types of information of a process or equipment with sensors and detect or predict abnormal states based on artificial intelligence, thereby increasing the efficiency of the process and minimizing the effort required for management.

Korean Patent No. 10-0570528 entitled "Process Equipment Monitoring System and Model Generation Method," which is a prior art, proposes a system that can determine abnormal states of process equipment using artificial intelligence. In order to manage a process using artificial intelligence as described above, it is necessary to analyze data obtained from each process and establish an artificial intelligence model through learning.

However, the prior art is inconvenient in that, when process equipment is monitored, a different artificial intelligence algorithm and model need to be applied depending on the process or equipment. Furthermore, whenever new equipment is added, it is necessary to prepare artificial intelligence learning data for the equipment, to train a new artificial intelligence model, and to develop a new system for connecting the data of the newly added equipment to the trained artificial intelligence model and then analyzing the data.

Therefore, there is a demand for a method that enables artificial intelligence analysis to be easily applied to a new device without developing a separate system even when a user adds the new device.

SUMMARY

An object of the present invention is to enable the artificial intelligence analysis of a new device without requiring a process, such as a process of developing a separate system, when a user installs the new device.

An object of the present invention is to enable a user to select an artificial intelligence configuration that has been applied to a device having the same type as a newly installed device and thus easily apply artificial intelligence analysis to the new device.

An object of the present invention is to enable a user to easily perform the artificial intelligence analysis of a new device only by selecting an artificial intelligence algorithm and learning data.

An object of the present invention is to enable sensing data of other devices of the same type to be used as learning data of a new device of the corresponding type, thereby enabling artificial intelligence analysis at the same time that the new device is installed.

An object of the present invention is to enable sensing data of a device selected from among other devices of the same type by a user to be used as learning data, thereby generating an artificial intelligence configuration suitable for a situation.

An object of the present invention is to enable a user to label sensing information of other devices and select state information corresponding to each label, thereby generating learning data suitable for a situation and then generating an artificial intelligence configuration.

In order to accomplish the above objects, an embodiment of the present invention provides an artificial intelligence configuration system including: a device type information storage unit configured to store device type information for a plurality of device types to be monitored; an artificial intelligence configuration information storage unit configured to store one or more pieces of artificial intelligence configuration information for each of the device types; a device information storage unit configured to store device information for each actual device of each of the device types; an artificial intelligence configuration unit configured to receive a device addition command for one of the plurality of device types from a user, and to receive a selection input for one of pieces of artificial intelligence configuration information for a device type corresponding to the device addition command from the user by consulting the artificial intelligence configuration information storage unit; a device configuration unit configured to store device information for an actual device included in the device addition command and the selected artificial intelligence configuration information in association with each other in the device information storage unit, and to configure a connection with the actual device; and a sensing data analysis unit configured to receive sensing information of the device over the configured connection using the selected artificial intelligence configuration information, to analyze the received sensing information using the selected artificial intelligence configuration information, and to provide the results of the analysis to the user.

In this case, the artificial intelligence configuration unit may receive an artificial intelligence configuration addition command from the user, and may receive a selection input for one of a plurality of artificial intelligence algorithms applicable to a device type corresponding to the device addition command, generate a new artificial intelligence configuration, and store the new artificial intelligence configuration in the artificial intelligence configuration storage unit.

Furthermore, the artificial intelligence configuration system may further include a sensing information storage unit configured to store sensing information collected for the each actual device, and the artificial intelligence configuration unit may generate an artificial intelligence configuration by receiving a selection input for learning data of the selected artificial intelligence algorithm selected from the sensing information stored in the sensing information storage unit and training the selected artificial intelligence algorithm on the selected learning data.

Furthermore, the artificial intelligence configuration unit may provide the user with actual devices belonging to the device type corresponding to the device addition command, may receive a selection input for at least one of the actual devices from the user, and may select sensing information, collected from the selected actual device, as learning data in the sensing information storage unit.

In this case, the artificial intelligence configuration unit may provide the selected sensing information to the user, may receive labeling information for each piece of sensing information from the user, and may receive state information for each piece of labeling information from the user and generate the sensing information, to which the labeling information is added, as learning data.

The present invention has the effect of enabling the artificial intelligence analysis of a new device without requiring a process, such as a process of developing a separate system, when a user installs the new device.

The present invention has the effect of enabling a user to select an artificial intelligence configuration that has been applied to a device having the same type as a newly installed device and thus easily apply artificial intelligence analysis to the new device.

The present invention has the effect of enabling a user to easily perform the artificial intelligence analysis of a new device only by selecting an artificial intelligence algorithm and learning data.

The present invention has the effect of enabling sensing data of other devices of the same type to be used as learning data of a new device of the corresponding type, thereby enabling artificial intelligence analysis at the same time that the new device is installed.

The present invention has the effect of enabling sensing data of a device selected from among other devices of the same type by a user to be used as learning data, thereby generating an artificial intelligence configuration suitable for a situation.

The present invention has the effect of enabling a user to label sensing information of other devices and select state information corresponding to each label, thereby generating learning data suitable for a situation and then generating an artificial intelligence configuration.

BRIEF DESCRIPTION OF THE DRAWINGS

FIG. 3 is a diagram showing an example of a screen on which an artificial intelligence algorithm and learning data are selected in an artificial intelligence configuration system according to an embodiment of the present invention;

FIG. 5 is a diagram showing an example of a screen on which labeling is performed on sensing data of another device in an artificial intelligence configuration system according to an embodiment of the present invention.

DETAILED DESCRIPTION

Figure 1:
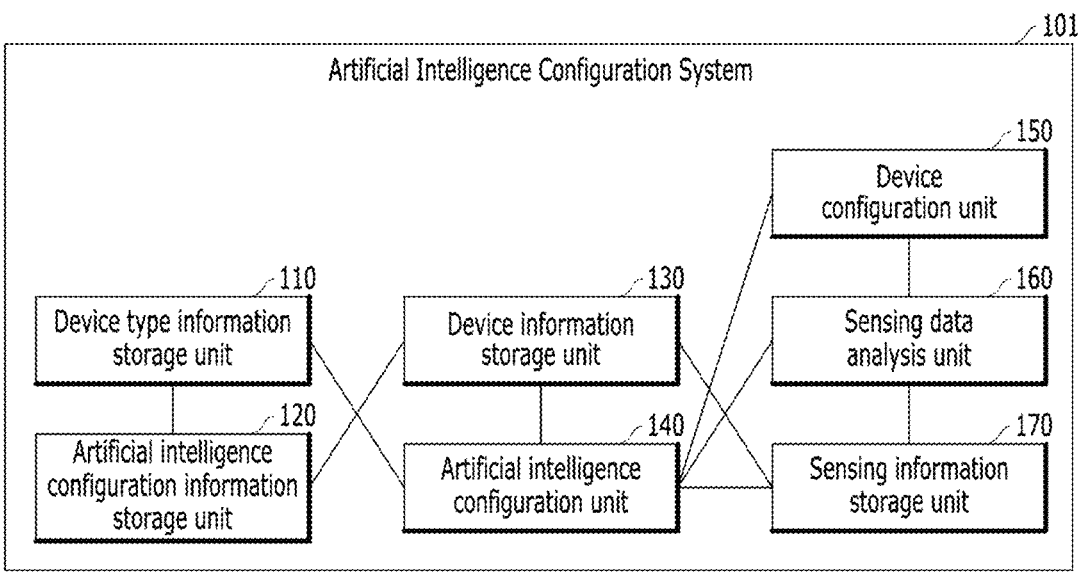
FIG. 1 is a diagram showing the internal configuration of an artificial intelligence configuration system according to an embodiment of the present invention.

In order to accomplish the above objects, an embodiment of the present invention provides an artificial intelligence configuration system including: a device type information storage unit configured to store device type information for a plurality of device types to be monitored; an artificial intelligence configuration information storage unit configured to store one or more pieces of artificial intelligence configuration information for each of the device types; a device information storage unit configured to store device information for each actual device of each of the device types; an artificial intelligence configuration unit configured to receive a device addition command for one of the plurality of device types from a user, and to receive a selection input for one of pieces of artificial intelligence configuration information for a device type corresponding to the device addition command from the user by consulting the artificial intelligence configuration information storage unit; a device configuration unit configured to store device information for an actual device included in the device addition command and the selected artificial intelligence configuration information in association with each other in the device information storage unit, and to configure a connection with the actual device; and a sensing data analysis unit configured to receive sensing information of the device over the configured connection using the selected artificial intelligence configuration information, to analyze the received sensing information using the selected artificial intelligence configuration information, and to provide results of the analysis to the user.

In this case, the artificial intelligence configuration unit may receive an artificial intelligence configuration addition command from the user, and may receive a selection input for one of a plurality of artificial intelligence algorithms applicable to a device type corresponding to the device addition command, generate a new artificial intelligence configuration, and store the new artificial intelligence configuration in the artificial intelligence configuration storage unit.

Furthermore, the artificial intelligence configuration system may further include a sensing information storage unit configured to store sensing information collected for the each actual device, and the artificial intelligence configuration unit may generate an artificial intelligence configuration by receiving a selection input for learning data of the selected artificial intelligence algorithm selected from the sensing information stored in the sensing information storage unit and training the selected artificial intelligence algorithm on the selected learning data.

Furthermore, the artificial intelligence configuration unit may provide the user with actual devices belonging to the device type corresponding to the device addition command, may receive a selection input for at least one of the actual devices from the user, and may select sensing information, collected from the selected actual device, as learning data in the sensing information storage unit.

In this case, the artificial intelligence configuration unit may provide the selected sensing information to the user, may receive labeling information for each piece of sensing information from the user, and may receive state information for each piece of labeling information from the user and generate the sensing information, to which the labeling information is added, as learning data.

Hereinafter, preferred embodiments of the present invention will be described in detail with reference to the accompanying drawings. In the description of the present invention, when it is determined that a detailed description of a related known configuration or function may obscure the gist of the present invention, the detailed description will be omitted. In addition, in the description of embodiments of the present invention, specific numerical values are only examples, and the scope of the invention is not limited thereby.

An artificial intelligence configuration system according to the present invention may be configured in the form of a server that is equipped with a central processing unit (CPU) and memory and is connectable to another terminal over a communication network such as the Internet. However, the present invention is not limited by components such as the central processing unit, the memory, etc. In addition, the data boundary deriving system according to the present invention may be configured as a physical device, or may be implemented in a form distributed over a plurality of devices.

FIG. 1 is a diagram showing the internal configuration of an artificial intelligence configuration system according to an embodiment of the present invention.

An artificial intelligence configuration system 101 according to an embodiment of the present invention may include a device type information storage unit 110, an artificial intelligence configuration information storage unit 120, a device information storage unit 130, an artificial intelligence configuration unit 140, a device configuration unit 150, a sensing data analysis unit 160, and a sensing information storage unit 170. The individual components may be software modules that operate in the physically same computer system, and may have forms that operate in such a manner that two or more physically separate computer systems are configured to operate in conjunction with each other. Various embodiments including the same functions fall within the scope of the present invention.

The device type information storage unit 110 stores device type information for a plurality of device types to be monitored. A device that a user wants to configure is a network device that can communicate with a cloud system through various communication modules such as cellular, Wi-Fi, Bluetooth, and Zig-Bee communication modules. The device may function to transmit sensing information or receive a command and then perform an operation through communication.

The device type information storage unit 110 may store information about the types to which such devices belong. For example, the information may include information about the manufacturer, product number, version and/or the like of each of the devices. In the case where the information about the types of devices is stored in this manner, when a new device is installed, the information of another device of the same type may be utilized through the above storage, so that the configuration of artificial intelligence can be performed more easily.

The device type information storage unit 110 is preferably configured to record information about devices operable in conjunction with the artificial intelligence configuration system 101 of the present invention in advance. When necessary, the device type information storage unit 110 may be configured to allow the user to register a new device that has not been present before.

The artificial intelligence configuration information storage unit 120 stores one or more pieces of artificial intelligence configuration information for each of the device types. Devices registered in and connected to the artificial intelligence configuration system 101 of the present invention each have artificial intelligence configuration information for the analysis of each of the devices. The artificial intelligence configuration information may include information about input data necessary for device analysis, output information derived as the results of the analysis, an artificial intelligence algorithm for the analysis, and an artificial intelligence model trained through learning data.

The artificial intelligence configuration information stored in the artificial intelligence configuration information storage unit 120 is stored in association with each of the device types. Accordingly, in the case where artificial intelligence configuration information is present for one device, when the same device is connected, device analysis may be performed using a preset artificial intelligence configuration. In particular, when the user does not directly connect a device but there is a case where the same device has been previously connected to and used in conjunction with the cloud system of the artificial intelligence configuration system 101, an existing artificial intelligence configuration may be easily used.

The device information storage unit 130 stores device information for each actual device of each of the device types. Multiple actual devices may be connected and used for one device type. The device information storage unit 130 stores device information for each actual individual device. The device information may include identification information (a product serial number, or the like) for identifying a device, information about the owner of the device, information about the usage environment of the device, information about the purpose of use of the device, and/or the like. Through the device information, the characteristics of each actual device may be identified.

The device information storage unit 130 stores new device information whenever the user sets a new device one by one. Information about an artificial intelligence configuration set in the device may be stored in association with each device. As the artificial intelligence configuration information of the device is stored in this manner, sensing data collected from each device may be analyzed using corresponding artificial intelligence configuration information.

The artificial intelligence configuration unit 140 receives a device addition command for one of the plurality of device types from the user, and also receives a selection input for one of the pieces of artificial intelligence configuration information for a device type corresponding to the device addition command from the user by consulting the artificial intelligence configuration information storage unit 120.

The artificial intelligence configuration unit 140 may first provide the user with device type information that can be set in the artificial intelligence configuration system 101 of the present invention in the form of a list or search screen. In this case, the artificial intelligence configuration unit 140 may receive a device addition command when the user selects the type of device to be actually configured from the device type information and inputs information about an actual device to be configured.

When the artificial intelligence configuration unit 140 receives the device addition command as described above, the artificial intelligence configuration unit 140 may consult the artificial intelligence configuration information storage unit 120, may checks artificial intelligence configuration information corresponding to the type of device to be configured, and may provide artificial intelligence configuration information to the user, so that the user may select necessary artificial intelligence configuration information from the provided artificial intelligence configuration information. In this case, the artificial intelligence configuration information corresponding to the type of device provided to the user may be related to a device previously configured by the user or may be artificial intelligence configuration information about a device previously configured by another user.

The artificial intelligence configuration unit 140 may manage authority for artificial intelligence configuration information directly set by the user as needed. The artificial intelligence configuration unit 140 may be configured to allow the artificial intelligence configuration information of the device to be disclosed to another person only when the user has set the artificial intelligence configuration information generated by the user to be shared with others. In addition, in some cases, there may be provided a platform that allows users to buy and sell artificial intelligence configuration information. When the artificial intelligence configuration unit 140 receives the artificial intelligence configuration information of the user, it transfers information about it to the device configuration unit 150.

In addition, when the user wants to generate a new artificial intelligence configuration without using a previously stored artificial intelligence configuration, the artificial intelligence configuration unit 140 may receive an artificial intelligence configuration addition command from the user, may receive a selection input for one of a plurality of artificial intelligence algorithms applicable to a device type corresponding to the device addition command, generate a new artificial intelligence configuration, and store the new artificial intelligence configuration in the artificial intelligence configuration storage unit 120, and may apply the new artificial intelligence configuration to the device the user wants to configure.

In the case where a previously registered artificial intelligence configuration is used without change, when a corresponding device is used in a different environment for a purpose different from a previous purpose, an appropriate artificial intelligence configuration may not be utilized. Accordingly, it may be possible to allow the user to make a new artificial intelligence configuration.

In order to make a new artificial intelligence configuration in the artificial intelligence configuration unit 140, an artificial intelligence algorithm, learning data, and/or the like included in artificial intelligence configuration information need to be selected, as described above. Accordingly, the artificial intelligence configuration unit 140 consults the device type information of the device that the user wants to configure, and provides the user with a plurality of artificial intelligence algorithms available for the analysis of the corresponding device type so that the user can select one of the algorithms.

In addition, in order to obtain learning data, the artificial intelligence configuration unit 140 may consult the sensing information storage unit 170 in which sensing information received from other existing devices is stored, may generate an artificial intelligence model by performing learning using the existing sensing information as learning data, and may include it in an artificial intelligence configuration.

In this case, when there are multiple existing devices of a device type to be set, information about these devices may be provided, and the user is allowed to select sensing information to be used as learning data by checking information such as the purposes and usage environments of the devices. Even for the same device type, input sensing information may vary depending on the purpose and environment for and in which a corresponding device is used. Accordingly, when the user uses existing sensing information without selecting sensing information, accurate artificial intelligence analysis may not be performed because learning data suitable for a necessary situation cannot be used.

Accordingly, the artificial intelligence configuration unit 140 provides the user with actual devices belonging to the device type corresponding to the device addition command, receives a selection input for at least one of the actual devices from the user, and selects sensing information, collected from the selected actual device, as learning data in the sensing information storage unit. Furthermore, in sane cases, desired learning data may be constructed by setting a period for sensing data to be used for each device.

The artificial intelligence configuration unit 140 may provide the selected sensing information to the user, may receive labeling information for each piece of sensing information from the user, and may receive state information for each piece of labeling information from the user and generate the sensing information, to which the labeling information is added, as learning data.

In order to enable supervised learning, each piece of data for learning needs to be classified according to the state the data represents. To this end, labeling information needs to be included in each piece of data. Since the sensing information received from the device includes only sensed information, the state each piece of information represents is not identified.

Therefore, learning data in which the state each data represents is clearly identified may be generated in such a manner that the artificial intelligence configuration unit 140 provides the user with sensing information for the devices selected by the user in the form of a list and the user sets labeling information corresponding to state information that can be generated from each corresponding device and adds labeling information to each piece of sensing information.

In a simple example, in the case where the device is a thermometer and the sensing information is temperature information, when the user sets the status information "high temperature," "low temperature," and "optimal temperature" for labeling information 1, 2, and 3, respectively, and assigns one of 1, 2, and 3 to temperature while viewing sensing information, an artificial intelligence configuration that can appropriately operate an air conditioner may be generated by performing learning using the above data as learning data.

In addition, the learning data generated by the artificial intelligence configuration unit 140 may be learning data generated by processing or augmenting sensing data as well as information obtained by simply labeling sensing information.

The device configuration unit 150 stores device information for an actual device included in the device addition command and the selected artificial intelligence configuration information in association with each other in the device information storage unit 130, and configures a connection with the actual device.

When the artificial intelligence configuration information is fixed in the artificial intelligence configuration unit 140, the device configuration unit 150 stores the artificial intelligence configuration information in association with information about the actual device, so that sensing information received from a device configured thereafter can be analyzed using the artificial intelligence configuration information.

In addition, the device configuration unit 150 configures a connection so that the device can be actually connected to the artificial intelligence configuration system 101, which is a cloud system, and can transmit sensing information or receive a control signal over a communication network. The connection configuration may be made by receiving the input of the IP address information or communication protocol information of the device. Various technologies for connecting Internet-of-Things (IoT) devices may be applied in this case.

The sensing data analysis unit 160 receives the sensing information of the device over the configured connection using the selected artificial intelligence configuration information, analyzes the received sensing information using the selected artificial intelligence configuration information, and provides the results of the analysis to the user.

The sensing data analysis unit 160 may run the artificial intelligence model configured based on the artificial intelligence configuration information, and may obtain resulting values by inputting device sensing information received through the connection configured in the artificial intelligence model. As described above, since the learning data is labeled, the state that the current sensing information represents may be analyzed in real time in connection with the state information set by the user based on this, and this information may be provided to the user, so that the user can easily determine the current state of the device.

As described above, the sensing data analysis unit 160 may analyze sensing information collected from a connected device based on the artificial intelligence configuration information without installing or running a separate program and provide the results of the analysis. Accordingly, anyone may easily use artificial intelligence analysis for a device.

The sensing information storage unit 170 stores sensing information collected for each actual device. As described above, the sensing information of the device is used to analyze the device, and may be stored to be used as learning data for analyzing the corresponding device or other devices in the future. In particular, a configuration may be made such that sensing information is stored in association with each piece of actual device information, so that the user can select only a device having a high relevance to a device to be newly configured from among existing devices and utilize the sensing information of the corresponding device as learning data.

Figure 2:
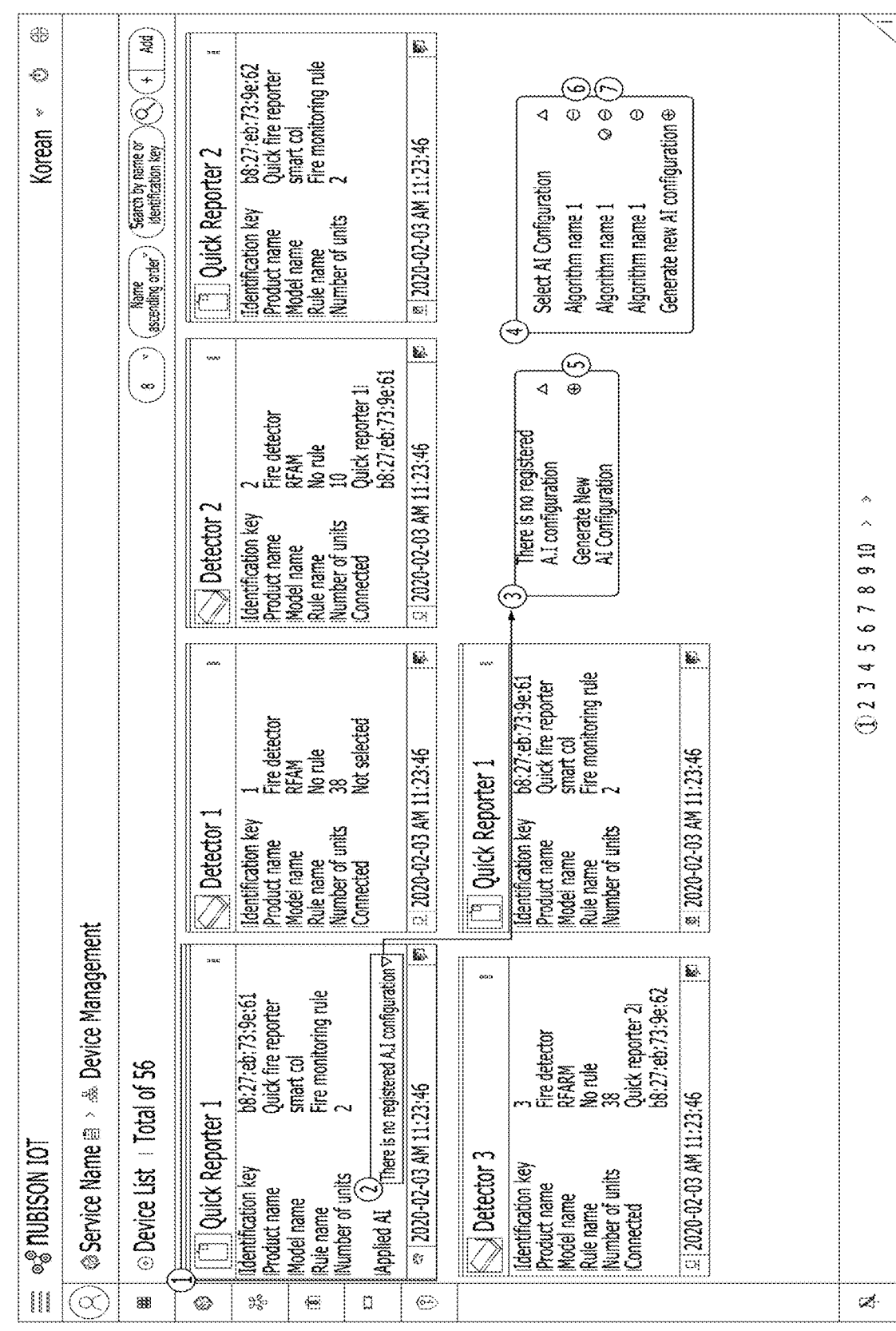
FIG. 2 is a diagram showing an example of a screen on which a user selects an artificial intelligence configuration in an artificial intelligence configuration system according to an embodiment of the present invention.

FIG. 2 is a diagram showing an example of a screen on which a user selects an artificial intelligence configuration in an artificial intelligence configuration system according to an embodiment of the present invention.

As shown in the drawing, when a user registers a new device, he or she may select a device type to be registered, may check artificial intelligence configuration information corresponding to the selected device type, and may select artificial intelligence configuration information when there is the artificial intelligence configuration information suitable for application so that the selected artificial intelligence configuration information can be immediately used.

Furthermore, as shown in the drawing, when the artificial intelligence configuration information of another device having the same type as a device to be configured is not stored or is not suitable for application to the device to be set, a new artificial intelligence configuration may be generated by selecting "Generate New Artificial Intelligence Configuration" and selecting the artificial intelligence algorithm to be applied to the new artificial intelligence configuration.

FIG. 3 is a diagram showing an example of a screen on which an artificial intelligence algorithm and learning data are selected in an artificial intelligence configuration system according to an embodiment of the present invention.

As shown in the drawing, when a user first selects a device, whose sensing information will be consulted, from among devices having the same type as a device to be configured, the sensing information of the corresponding device is output to the user as original data, as shown in the top center.

In this case, as shown in the lower portion of the left side on the screen, information about a time interval for sensing information to be used may be selected, through which learning data in the same situation as a device to be newly set can be selected. In addition, when it is necessary to check a device for an error through artificial intelligence analysis, it is preferable to use sensing information including a point in time when an error actually occurred as learning data, so that the user can select the sensing information.

When the sensing information of another existing device is output as original data according to the user's selection as described above, the user may perform labeling on the sensing information and store state information corresponding to each label. In the drawing, when the button "Set Target" on the top center is clicked, labeled training data may be generated by setting each state as a target and then selecting original data corresponding to the target.

The generated learning data is displayed in the form of a list at the bottom center so that the user can finally check it. Learning may be performed using the learning data generated as described above, a learned model may be evaluated, the results of the evaluation may be checked, and a final learning model may be determined to be an artificial intelligence configuration according to the selection of the user and applied for the analysis of a configured device.

Figure 4:
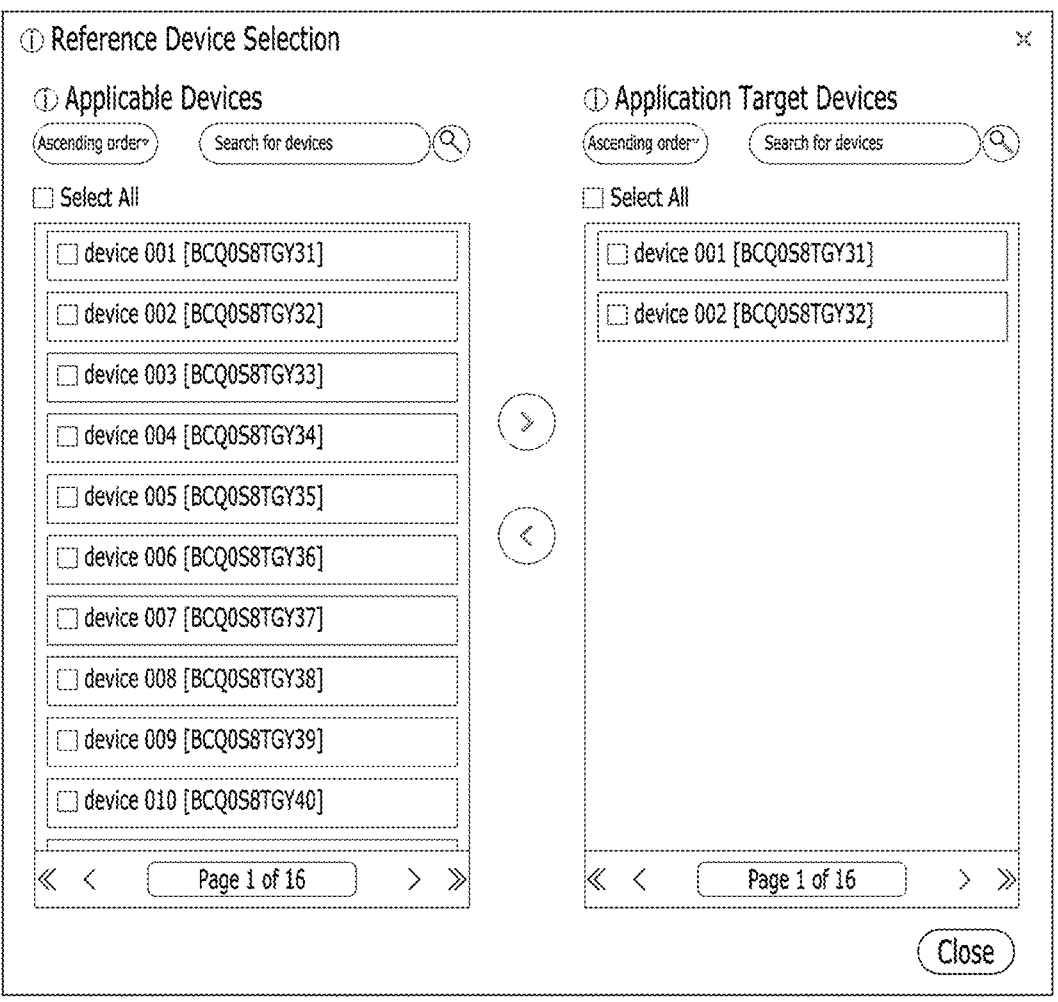
FIG. 4 is a diagram showing an example of a screen on which a user selects another device to be applied as learning data in an artificial intelligence configuration system according to an embodiment of the present invention.

FIG. 4 is a diagram showing an example of a screen on which a user selects another device to be applied as learning data in an artificial intelligence configuration system according to an embodiment of the present invention.

As shown in the drawing, when a user wants to configure a new device, the artificial intelligence configuration system 101 of the present invention may provide the user with a list of other devices having the same type as the corresponding device and allow the user to select an appropriate device from the list, thereby enabling sensing information of a device, used for a similar purpose in an environment similar to that of the device to be configured, to be used as learning data.

FIG. 5 is a diagram showing an example of a screen on which labeling is performed on sensing data of another device in an artificial intelligence configuration system according to an embodiment of the present invention.

As shown in the drawing, a user may set a plurality of targets, and these targets indicate specific pieces of state information that the user wants to check. Furthermore, corresponding pieces of labeling information are assigned to these pieces of state information, so that the user can assign the labeling information while viewing sensing information, thereby enabling accurate learning data to be generated.

Figure 6:
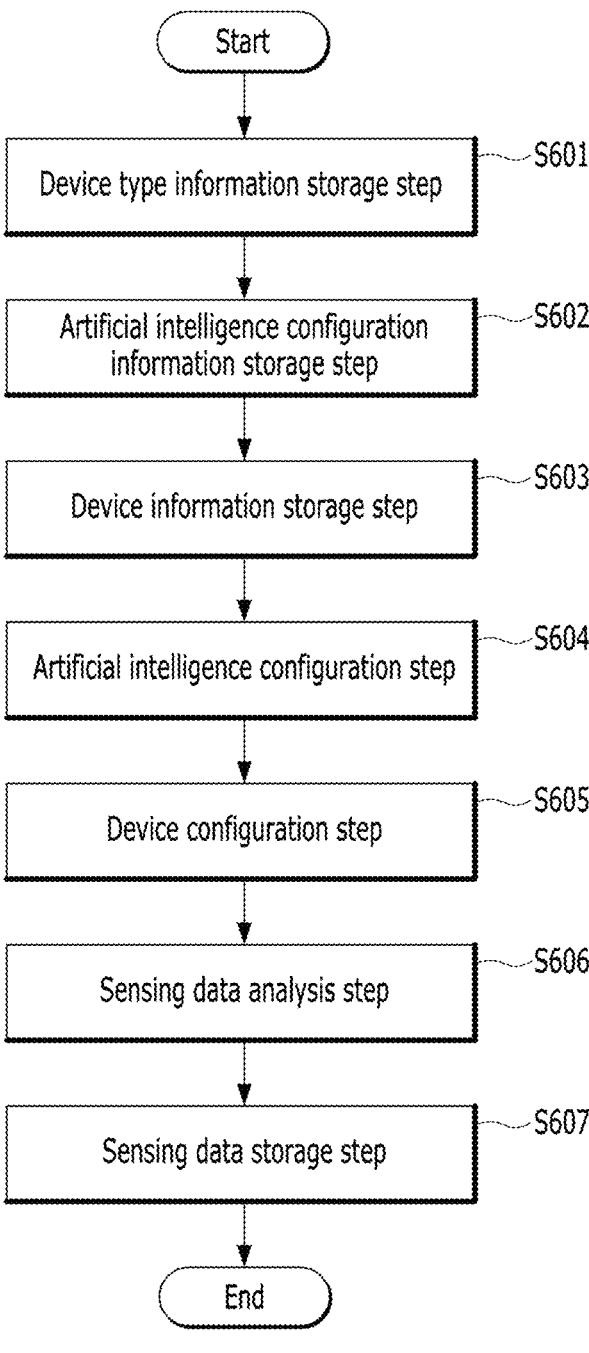
FIG. 6 is a flowchart illustrating the flow of an artificial intelligence configuration method according to an embodiment of the present invention.

FIG. 6 is a flowchart illustrating the flow of an artificial intelligence configuration method according to an embodiment of the present invention.

The artificial intelligence configuration method according to the present invention is a method of configuring artificial intelligence in an artificial intelligence configuration system equipped with a central processing unit and memory, and may be driven in such a computing system.

Accordingly, the artificial intelligence configuration method includes all the characteristic configurations described in conjunction with the artificial intelligence configuration system described above, and the items that will not be described in the following description can also be implemented with reference to the description of the artificial intelligence configuration system described above.

In a device type information storage step S601, device type information for a plurality of device types to be monitored is stored in the device type information storage unit 110. A device that a user wants to configure is a network device that can communicate with a cloud system through various communication modules such as cellular, Wi-Fi, Bluetooth, and Zig-Bee communication modules. The device may function to transmit sensing information or receive a command and then perform an operation through communication.

In the device type information storage step S601, there may be stored information about the types to which such devices belong. For example, the information may include information about the manufacturer, product number, version and/or the like of each of the devices. In the case where the information about the types of devices is stored in this manner, when a new device is installed, the information of another device of the same type may be utilized through the above storage, so that the configuration of artificial intelligence can be performed more easily.

The device type information storage step S601 is preferably configured to record information about devices operable in conjunction with the artificial intelligence configuration system 101 of the present invention in advance. When necessary, the device type information storage step S601 may be configured to allow the user to register a new device that has not been present before.

In an artificial intelligence configuration information storage step S602, one or more pieces of artificial intelligence configuration information for each of the device types are stored in the artificial intelligence configuration information storage unit 120. Devices registered in and connected to the artificial intelligence configuration system 101 of the present invention each have artificial intelligence configuration information for the analysis of each of the devices. The artificial intelligence configuration information may include information about input data necessary for device analysis, output information derived as the results of the analysis, an artificial intelligence algorithm for the analysis, and an artificial intelligence model trained through learning data.

The artificial intelligence configuration information stored in the artificial intelligence configuration information storage step S602 is stored in association with each of the device types. Accordingly, in the case where artificial intelligence configuration information is present for one device, when the same device is connected, device analysis may be performed using a preset artificial intelligence configuration. In particular, when the user does not directly connect a device but there is a case where the same device has been previously connected to and used in conjunction with the cloud system of the artificial intelligence configuration system 101, an existing artificial intelligence configuration may be easily used.

In a device information storage step S603, device information for each actual device of each of the device types may be stored in the device information storage unit 130. Multiple actual devices may be connected and used for each device type. In the device information storage step S603, there is stored device information for each actual individual device. The device information may include identification information (a product serial number, or the like) for identifying a device, information about the owner of the device, information about the usage environment of the device, information about the purpose of use of the device, and/or the like. Through the device information, the characteristics of each actual device may be identified.

In the device information storage step 603, new device information is stored whenever the user sets a new device one by one. Information about an artificial intelligence configuration set in the device may be stored in association with each device. As the artificial intelligence configuration information of the device is stored in this manner, sensing data collected from each device may be analyzed using corresponding artificial intelligence configuration information.

In an artificial intelligence configuration step S604, a device addition command for one of the plurality of device types is received from the user, and a selection input for one of pieces of artificial intelligence configuration information for a device type corresponding to the device addition command is received from the user through the consultation of the artificial intelligence configuration information storage unit 120.

In the artificial intelligence configuration step S604, the user with device type information that can be set in the artificial intelligence configuration system 101 of the present invention may first be provided in the form of a list or search screen, and a device addition command may be received when the user selects the type of device to be actually configured from the device type information and inputs information about an actual device to be configured.

In the artificial intelligence configuration step S604, when the device addition command is received as described above, the artificial intelligence configuration information storage unit 120 may be consulted, artificial intelligence configuration information corresponding to the type of device to be configured may be checked, and artificial intelligence configuration information may be provided to the user, so that the user can select necessary artificial intelligence configuration information from the provided artificial intelligence configuration information. In this case, the artificial intelligence configuration information corresponding to the type of device provided to the user may be related to a device previously configured by the user or may be artificial intelligence configuration information about a device previously configured by another user.

Furthermore, in the artificial intelligence configuration step S604, when the user wants to generate a new artificial intelligence configuration without using a previously stored artificial intelligence configuration, an artificial intelligence configuration addition command may be received from the user, a selection input for one of a plurality of artificial intelligence algorithms applicable to a device type corresponding to the device addition command may be received, a new artificial intelligence configuration may be generated, the new artificial intelligence configuration may be stored in the artificial intelligence configuration storage unit 120, and the new artificial intelligence configuration may be applied to the device the user wants to configure.

In order to make a new artificial intelligence configuration in the artificial intelligence configuration step S604, an artificial intelligence algorithm, learning data, and/or the like included in artificial intelligence configuration information need to be selected, as described above. Accordingly, in the artificial intelligence configuration step S604, the device type information of the device the user wants to configure may be consulted, and a plurality of artificial intelligence algorithms available for the analysis of the corresponding device type may be provided to the user so that the user can select one of the algorithms.

In addition, in order to obtain learning data, in the artificial intelligence configuration step S604, the sensing information storage unit 170 in which sensing information received from other existing devices is stored may be consulted, and an artificial intelligence model may be generated by performing learning using the existing sensing information as learning data and be included in an artificial intelligence configuration.

In the artificial intelligence configuration step S604, actual devices belonging to the device type corresponding to the device addition command is provided to the user, a selection input for at least one of the actual devices is received from the user, and sensing information collected from the selected actual device is selected as learning data in the sensing information storage unit. Furthermore, in some cases, desired learning data may be constructed by setting a period for sensing data to be used for each device.

In the artificial intelligence configuration step S604, the selected sensing information may be provided to the user, labeling information for each piece of sensing information may be received from the user, state information for each piece of labeling information may be received from the user, and the sensing information to which the labeling information is added may be generated as learning data.

In the artificial intelligence configuration step S604, learning data in which the state that each piece of data represents is clearly identified may be generated in such a manner that sensing information for the devices selected by the user is provided to the user in the form of a list and the user sets labeling information corresponding to state information that can be generated from each corresponding device and adds labeling information to each piece of sensing information.

In addition, the learning data generated in the artificial intelligence configuration step S604 may be learning data generated by processing or augmenting sensing data as well as information obtained by simply labeling sensing information.

In a device configuration step S605, the device information for the actual device included in the device addition command and the selected artificial intelligence configuration information is stored in association with each other in the device information storage unit 130, and a connection with the actual device is configured.

In the device configuration step S605, when the artificial intelligence configuration information is fixed in the artificial intelligence configuration step S604, the artificial intelligence configuration information is stored in association with information about the actual device, so that sensing information received from a device configured thereafter can be analyzed using the artificial intelligence configuration information.

In addition, in the device configuration step S605, a connection is configured such that the device can be actually connected to the artificial intelligence configuration system 101, which is a cloud system, and can transmit sensing information or receive a control signal over a communication network. The connection configuration may be made by receiving the input of the IP address information or communication protocol information of the device. Various technologies for connecting Internet-of-Things (IoT) devices may be applied in this case.

In a sensing data analysis step S606, the sensing information of the device is received over the configured connection using the selected artificial intelligence configuration information, the received sensing information is analyzed using the selected artificial intelligence configuration information, and the results of the analysis are provided to the user.

In the sensing data analysis step S606, the artificial intelligence model configured based on the artificial intelligence configuration information may be run, and resulting values may be obtained by inputting device sensing information received through the connection configured in the artificial intelligence model. As described above, since the learning data is labeled, the state that the current sensing information represents may be analyzed in real time in connection with the state information set by the user based on this, and this information may be provided to the user, so that the user can easily determine the current state of the device.

As described above, in the sensing data analysis step S606, sensing information collected from a connected device may be analyzed based on the artificial intelligence configuration information without installing or running a separate program, and also the results of the analysis may be provided. Accordingly, anyone may easily use artificial intelligence analysis for a device.

In a sensing information storage step S607, sensing information collected for each actual device is stored. As described above, the sensing information of the device is used to analyze the device, and may be stored to be used as learning data for analyzing the corresponding device or other devices in the future. In particular, a configuration may be made such that sensing information is stored in association with each piece of actual device information, so that the user can select only a device having a high relevance to a device to be newly configured from among existing devices and utilize the sensing information of the corresponding device as learning data.

The artificial intelligence configuration method according to the present invention may be produced as a program that cause a computer to perform the data boundary deriving method, and may be recorded on a computer-readable storage medium.

Examples of the computer-readable storage medium include magnetic media such as hard disks, floppy disks and magnetic tapes, optical storage media such as CDROMs and DVDs, magneto-optical media such as floptical disks, and hardware devices specially configured to store and execute program instructions, such as RCM, RAM, flash memory, and the like.

Examples of the program instructions include high-level language codes executable by a computer using an interpreter or the like as well as machine language codes such as those produced by a compiler. The hardware devices may each be configured to act as one or more software modules in order to perform processing according to the present invention, and vice versa.

Although the foregoing description has been given with reference to the embodiments, those skilled in the art may modify and alter the present invention in various manners without departing from the spirit and scope of the present invention described in the claims below.

The present invention is directed to an artificial intelligence configuration system and method. The present invention provides an artificial intelligence configuration system including: a device type information storage unit configured to store device type information for a plurality of device types to be monitored; an artificial intelligence configuration information storage unit configured to store one or more pieces of artificial intelligence configuration information for each of the device types; a device information storage unit configured to store device information for each actual device of each of the device types; an artificial intelligence configuration unit configured to receive a device addition command for one of the plurality of device types from a user, and to receive a selection input for one of pieces of artificial intelligence configuration information for a device type corresponding to the device addition command from the user by consulting the artificial intelligence configuration information storage unit; a device configuration unit configured to store device information for an actual device included in the device addition command and the selected artificial intelligence configuration information in association with each other in the device information storage unit, and to configure a connection with the actual device; and a sensing data analysis unit configured to receive sensing information of the device over the configured connection using the selected artificial intelligence configuration information, to analyze the received sensing information using the selected artificial intelligence configuration information, and to provide the results of the analysis to the user, and also provides an artificial intelligence configuration method.

What is claimed is:

1. An artificial intelligence configuration system comprising:

a device type information storage unit configured to store device type information for a plurality of device types to be monitored;

an artificial intelligence configuration information storage unit configured to store one or more pieces of artificial intelligence configuration information for each of the device types;

a device information storage unit configured to store device information for each actual device of each of the device types;

an artificial intelligence configuration unit configured to receive a device addition command for one of the plurality of device types from a user, and to receive a selection input for one of pieces of artificial intelligence configuration information for a device type corresponding to the device addition command from the user by consulting the artificial intelligence configuration information storage unit;

a device configuration unit configured to store device information for an actual device included in the device addition command and the one of pieces of artificial intelligence configuration information selected based on the selection input in association with each other in the device information storage unit, and to configure a connection with the actual device; and a sensing data analysis unit configured to receive sensing information of the device over the configured connection using the selected artificial intelligence configuration information, to analyze the received sensing information using the selected artificial intelligence configuration information, and to provide results of the analysis to the user, wherein the artificial intelligence configuration unit is further configured to:

receive an artificial intelligence configuration addition command from the user; and receive a selection input from the user for one of a plurality of artificial intelligence algorithms applicable to a device type corresponding to the device addition command, generates a new artificial intelligence configuration, and stores the new artificial intelligence configuration in the artificial intelligence configuration storage unit.

2. The artificial intelligence configuration system of claim 1, further comprising a sensing information storage unit configured to store sensing information collected for the each actual device, wherein the artificial intelligence configuration unit is further configured to generate an artificial intelligence configuration by receiving a selection input for learning data of the selected artificial intelligence algorithm selected from the sensing information stored in the sensing information storage unit and training the selected artificial intelligence algorithm on the selected learning data.

3. The artificial intelligence configuration system of claim 2, wherein the artificial intelligence configuration unit is further configured to:

provide the user with actual devices belonging to the device type corresponding to the device addition command;

receive a selection input for at least one of the actual devices from the user; and select sensing information, collected from the selected actual device, as learning data in the sensing information storage unit.

4. The artificial intelligence configuration system of claim 3, wherein the artificial intelligence configuration unit is further configured to:

provide the selected sensing information to the user;

receive labeling information for each piece of sensing information from the user; and receive state information for each piece of labeling information from the user, and generates the sensing information, to which the labeling information is added, as learning data.

5. An artificial intelligence configuration method performed in an artificial intelligence configuration system equipped with a central processing unit and memory, the artificial intelligence configuration method comprising:

a device type information storage step of storing device type information for a plurality of device types to be monitored in a device type information storage unit;

an artificial intelligence configuration information storage step of storing one or more pieces of artificial intelligence configuration information for each of the device types in an artificial intelligence configuration information storage unit;

a device information storage step of storing device information for each actual device of each of the device types in a device information storage unit;

an artificial intelligence configuration step of receiving a device addition command for one of the plurality of device types from a user and also receiving a selection input for one of pieces of artificial intelligence configuration information for a device type corresponding to the device addition command from the user by consulting the artificial intelligence configuration information storage unit;

a device configuration step of storing device information for an actual device included in the device addition command and the one of pieces of artificial intelligence configuration information selected based on the selection input in association with each other in the device information storage unit and configuring a connection with the actual device; and a sensing data analysis step of receiving sensing information of the device over the configured connection using the selected artificial intelligence configuration information, analyzing the received sensing information using the selected artificial intelligence configuration information, and providing results of the analysis to the user, wherein the artificial intelligence configuration step comprises:

receiving an artificial intelligence configuration addition command from the user; and receiving a selection input from the user for one of a plurality of artificial intelligence algorithms applicable to a device type corresponding to the device addition command, generating a new artificial intelligence configuration, and storing the new artificial intelligence configuration in the artificial intelligence configuration storage unit.

6. The artificial intelligence configuration method of claim 5, further comprising a sensing information storage step of storing sensing information collected for the each actual device, wherein the artificial intelligence configuration step comprises generating an artificial intelligence configuration by receiving a selection input for learning data of the selected artificial intelligence algorithm selected from the sensing information stored in the sensing information storage unit and training the selected artificial intelligence algorithm on the selected learning data.

7. The artificial intelligence configuration method of claim 6, wherein the artificial intelligence configuration step comprises:

providing the user with actual devices belonging to the device type corresponding to the device addition command;

receiving a selection input for at least one of the actual devices from the user; and selecting sensing information, collected from the selected actual device, as learning data in the sensing information storage unit.

8. The artificial intelligence configuration method of claim 7, wherein the artificial intelligence configuration step comprises:

providing the selected sensing information to the user;

receiving labeling information for each piece of sensing information from the user; and receiving state information for each piece of labeling information from the user, and generating the sensing information, to which the labeling information is added, as learning data.

9. A computer-readable storage medium having stored thereon a program that causes a computer to perform the method of claim 5.

* * * * *